United States Patent
Cohen et al.

(10) Patent No.: US 11,486,976 B2
(45) Date of Patent: Nov. 1, 2022

(54) TAMPER-PROOF LIDAR

(71) Applicant: INTERNATIONAL BUSINESS MACHINES CORPORATION, Armonk, NY (US)

(72) Inventors: Guy M. Cohen, Westchester, NY (US); Abram L. Falk, Port Chester, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 838 days.

(21) Appl. No.: 16/415,161

(22) Filed: May 17, 2019

(65) Prior Publication Data
US 2020/0363507 A1    Nov. 19, 2020

(51) Int. Cl.
  *G01S 17/10*    (2020.01)
  *G01S 7/484*    (2006.01)
(52) U.S. Cl.
  CPC .............. *G01S 7/484* (2013.01); *G01S 17/10* (2013.01)
(58) Field of Classification Search
  CPC .................................. G01S 7/484; G01S 17/10
  See application file for complete search history.

(56) References Cited

U.S. PATENT DOCUMENTS

| | | | |
|---|---|---|---|
| 6,556,282 B2 | 4/2003 | Jamieson et al. | |
| 8,077,294 B1 | 12/2011 | Grund et al. | |
| 8,179,825 B2 | 5/2012 | Steer et al. | |
| 11,314,109 B1* | 4/2022 | Moon | G02F 1/0054 |
| 2017/0307736 A1 | 10/2017 | Donovan | |
| 2017/0329011 A1 | 11/2017 | Warke et al. | |
| 2017/0357000 A1* | 12/2017 | Bartlett | G01S 7/484 |

FOREIGN PATENT DOCUMENTS

WO    2017138886 A1    8/2017

OTHER PUBLICATIONS

Anonymous, "A revolution in Lidar applications", Online Download Apr. 23, 2018, URL<http://www.teledyneoptech.com/en/products/airborne-survey/titan/>, 4 pages.
Kim et al., "LIDAR pulse coding for high resolution range imaging at improved refresh rate", 2016 Optical Society of America, 19 pages.
Ruiz et al., "Nonvolatile Reconfigurable Phase-Change Metadevices for Beam Steering in the Near Infrared", Advanced Functional Materials, 2018, 28, 1704993, 9 pages.

(Continued)

*Primary Examiner* — Minh Q Phan
(74) *Attorney, Agent, or Firm* — Cantor Colburn LLP; Erik Johnson (57) ABSTRACT

A light detection and ranging (LiDAR) system is provided. The LiDAR system includes an emitter for emitting a light beam, a configurable light processing control unit to affect the light beam, a receiver for receiving the light beam and a computer system. The computer system controls operations of the light processing control unit, computes a distance to a target using a time of flight of the light beam from the emitter to the target and from the target to the receiver and simultaneously corroborates the computed distance by controlling the operations of the light processing control unit to focus and defocus the light beam.

20 Claims, 4 Drawing Sheets

(56) References Cited

OTHER PUBLICATIONS

Wang et al., "Optically Reconfigurable Photonic Devices", 2015, Online URL:<https://arxiv.org/pdf/1508.03818>, 12 pages.
Zou et al., "Phase change material based tunable reflectarray for free-space optical inter/intra chip interconnects", 2014, Optical Society of America, 7 pages.
Chen et al., "A broadband achromatic metalens for focusing and imaging in the visible", Nature Nanotechnology, 2018,13, pp. 220-226.

* cited by examiner

TAMPER-PROOF LIDAR

BACKGROUND

The present invention generally relates to computer controlled laser-based measurement systems and techniques, and more specifically, to a tamper-proof light detection and ranging (LiDAR) system.

LiDAR is a surveying method that measures distance to a target by illuminating the target with pulsed laser light and measuring reflected pulses with a sensor. The time it takes a laser pulse to travel from the LiDAR to a target and back as well as the shift in wavelengths can then be used to make digital 3-D representations of the target and its velocity. While LiDAR is commonly used to make high-resolution maps and is applicable to various other fields (e.g., geodesy, geomatics, archaeology, geography, geology, geomorphology, seismology, forestry, atmospheric physics, laser guidance, airborne laser swath mapping (ALSM) and laser altimetry), the technology can be used in control and navigation for some autonomous vehicles.

SUMMARY

Embodiments of the present invention are directed to a light detection and ranging (LiDAR) system. A non-limiting example of the LiDAR system includes an emitter for emitting a light beam, a configurable light processing control unit to affect the light beam, a receiver for receiving the light beam and a computer system. The computer system controls operations of the light processing control unit, computes a distance to a target using a time of flight of the light beam from the emitter to the target and from the target to the receiver and simultaneously corroborates the computed distance by controlling the operations of the light processing control unit to focus and defocus the light beam.

Embodiments of the present invention are directed to a computer system for controlling a light detection and ranging (LiDAR) system. A non-limiting example of the computer system includes a memory and a processor coupled to the memory and the LiDAR system and configured to perform a tamper-proofing method. The tamper-proofing method includes controlling a LiDAR element of the LiDAR system to emit a light beam toward a second body as an original signal and to receive light of the light beam that is reflected off the second body as a reflected signal, the LiDAR element being configured to be coupled to a first body movable relative to the second body, controlling an optical element optically disposed between the LiDAR element and the second body to apply a modification to the light beam and comparing the reflected signal to the original signal to determine whether the reflected signal corresponds to the original signal based on comparison results while accounting for the modification Embodiments of the present invention are directed to a tamper-proof light detection and ranging (LiDAR) system. A non-limiting example of the tamper-proof light detection and ranging (LiDAR) system includes LiDAR and optical elements and a processor. The LiDAR element is disposable on a support structure configured to be affixed to a first body movable relative to a second body. The LiDAR element is configured to emit a light beam toward the second body as an original signal and to receive light of the light beam that is reflected off the second body as a reflected signal. The optical element is optically interposable between the LiDAR element and the second body. The processor is coupled to the LiDAR element and the optical element. The processor is configured to control the optical element to apply a modification to the light beam, to compare the reflected signal to the original signal and to determine whether the reflected signal corresponds to the original signal based on comparison results while accounting for the modification.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, LiDAR uses ultraviolet, visible or near infrared light to image various types of objects and can target a wide range of materials, including non-metallic objects, rocks, rain, chemical compounds, aerosols, clouds and even single molecules.

For car related navigation, LiDAR will typically use infrared light due to eye safety requirements in the range of 1300 nm to 1550 nm (InGaAs/InP based laser), which is often preferable to 850 nm (GaAs based laser) since higher light power is allowed at longer wavelengths.

In certain cases, a narrow laser beam can map physical features with very high resolutions, such as when an aircraft uses LiDAR to map terrain at 30 cm resolution or better. Wavelengths used in LiDAR systems can vary to suit a target, and suitable combinations of wavelengths can allow for some types of remote mapping applications. LiDAR detection schemes can be "incoherent" or direct energy detection, which principally measures amplitude changes of reflected light, and "coherent," which is often used for measuring Doppler shifts or changes in phases of reflected light.

Systems that use LiDAR typically rely on a "time of flight" to measure distances between objects and Doppler shifts to measure relative velocities between objects but need to be able to verify that a received signal is an outcome of the original signal. This can often be an issue where a receiver is accidentally blinded by noise (i.e., the sun) or by another LiDAR. In such cases, the verification can be achieved by configuring the original signal as a long string of bits and the use of a matched filter in which case data accuracy can be maintained in an event that any interference that is detected is able to be characterized as accidental or noise.

The need to verify that a received signal is an outcome of the original signal can also be present where there is a risk of malicious interference. As an example, malicious interference can involve an object, which is coated with a radiation absorbing material. This radiation absorbing material will substantially attenuate the intensity of the reflected signal to be at or below noise level. Furthermore, the malicious object will include a receiver and a transmitter. The receiver will detect the LiDAR signal, and then transmit it back (as if it is a reflected signal) but with an intentional delay. The LiDAR system will consequently infer that a distance between the LiDAR and the malicious object is greater than it actually is. Malicious interference can also involve the malicious object adding a frequency shift to the "reflected signal" (that is the signal transmitted by the malicious object). In these cases, the LiDAR system will see a relative velocity between the reflective and emitting objects as being different from the actual relative velocity.

Turning now to an overview of the aspects of the invention, one or more embodiments of the invention address the above-described shortcomings of the prior art by providing a tamper-proof LiDAR system that uses focusing and defocusing, fast focusing and fast defocusing, predicative beam steering as well as multiple wavelengths to overcome malicious interference.

The above-described aspects of the invention address the shortcomings of the prior art by providing a tamper-proof LiDAR system that includes a support structure affixable to a first body movable relative to a second body, LiDAR elements, optical elements and a processor. The LiDAR element is disposable on the support structure to emit a light beam toward the second body as an original signal and to receive light of the light beam that is reflected off the second body as a reflected signal. The optical element is optically interposable between the LiDAR element and the second body or is integrated into the LiDAR element. The processor is coupled to the LiDAR element and the optical element. The processor is configured to control the optical element to apply a modification to the light beam, to compare the reflected signal to the original signal and to determine whether the reflected signal corresponds to the original signal based on comparison results while accounting for the modification.

Figure 1A:
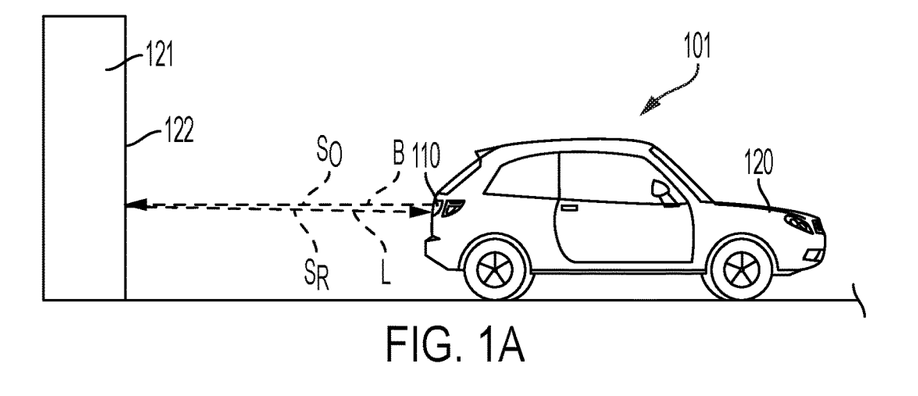
FIG. 1A is a schematic view of a light detection and ranging (LiDAR) system in accordance with embodiments of the present invention.
Figure 1B:
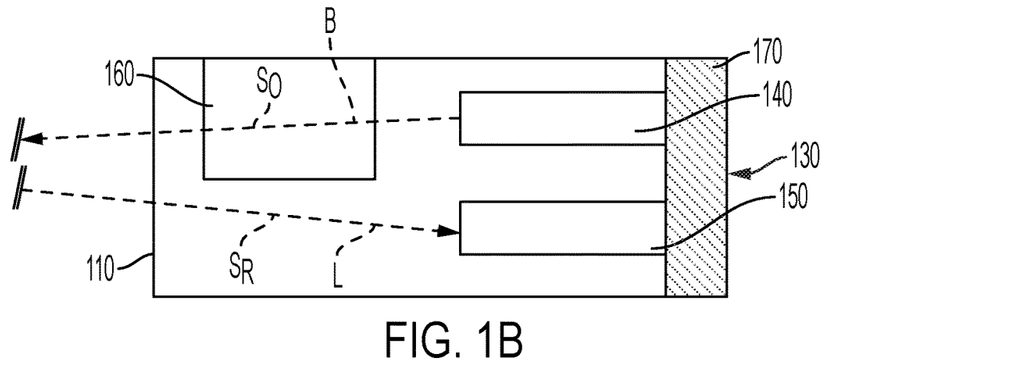
FIG. 1B is an enlarged schematic view of the LiDAR system of FIG. 1A in accordance with embodiments of the present invention

Turning now to a more detailed description of aspects of the present invention, FIGS. 1A and 1B depict a tamper-proof LiDAR system 101. The tamper-proof LiDAR system 101 includes a support structure 110. The support structure 110 is affixable to a first body 120, such as a vehicle, which is movable relative to a second body 121, such as a building or another car, the vehicle is moving toward or away from. The tamper-proof LiDAR system 101 further includes a LiDAR element 130, an optical element 160 and a processor 170. The LiDAR element 130 includes an emitter 140 and a receiver 150. The emitter 140 is disposable on the support structure 110 to emit a light beam B toward the second body 121 as an original signal $S_O$. The receiver 150 is disposable on the support structure 110 to receive light L of the light beam B that is reflected off the second body 121 as the reflected signal $S_R$. The optical element 160 is optically interposable between the emitter 140 and the second body 121. The processor 170 is operably coupled to the emitter 140 and the receiver 150 of the LiDAR element 130 and to the optical element 160.

It is to be understood that, while FIGS. 1A and 1B illustrate the emitter 140, the receiver 150 and the optical element 160 as physically separated units, this is not required and that embodiments of the present invention exist in which these modules are integrated into a system on a chip (SoC) or monolithically integrated onto a single chip.

Figure 2:
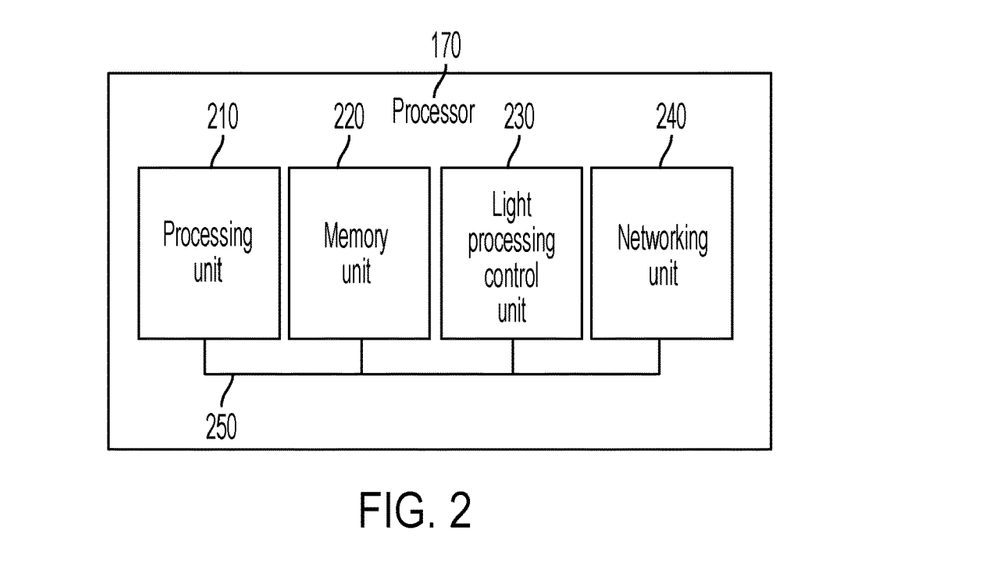
FIG. 2 is a schematic diagram of a processor of the LiDAR system of FIGS. 1A and 1B in accordance with embodiments of the present invention.

With reference to FIG. 2, the processor 170 includes a processing unit 210, a memory unit 220, a light processing control unit 230, which controls an operation of the optical element 160 in accordance with commands issued by the processing unit 210, a networking unit 240 by which the processing unit 210 is communicative with the emitter 140 and the receiver 150 and an input/output (I/O) bus 250 by which the processing unit 210 communicates with the memory unit 220, the light processing control unit 230 and the networking unit 240. The memory unit 220 has executable instructions stored thereon which are readable and executable by the processing unit 210.

When the executable instructions are read and executed by the processing unit 210, the executable instructions cause the processing unit 210 to operate as described herein. In particular, when the executable instructions are read and executed by the processing unit 210, the executable instructions cause the processing unit 210 to command the light processing control unit 230 to control the optical element 160 to apply a modification to the light beam B, to compare the reflected signal $S_R$ to the original signal $S_O$ and to determine whether the reflected signal $S_R$ corresponds to the original signal $S_O$ based on comparison results while accounting for effects of the application of the modification to the light beam B by the optical element 160.

With continued reference to FIGS. 1A and 1B and FIG. 2 and with additional reference to FIGS. 3A and 3B, FIGS. 4A and 4B and FIG. 5 and in accordance with embodiments of the present invention, the optical element 160 (best shown in FIG. 1) can be implemented as a two dimensional (2D) array of programmable elements where the optical properties of each programmable element can be programmed to a desired value to achieve the manipulation of the light beam B (see FIG. 1B).

Figure 3A:
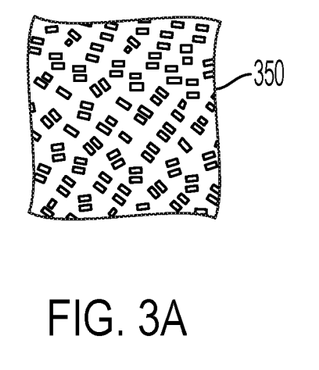
FIG. 3A is a perspective view a two-dimensional surface of an optical element in accordance with embodiments of the present invention.
Figure 3B:
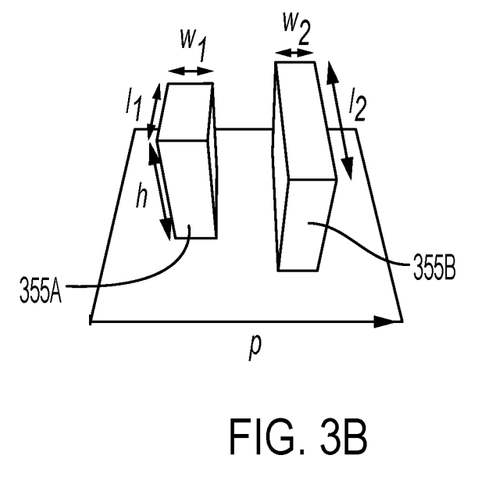
FIG. 3B is a perspective view of fins of the two-dimensional surface of FIG. 3A.

As shown in FIGS. 3A and 3B, a 2D array of elements 350 is provided with each element 350 including one or more fins 355A and 355B patterned on a surface to form an achromatic metalens. In earlier work (see for example, Wei Ting Chen et al.), fins 355A and 355B were formed of metals and therefore the optical properties of the achromatic metalens are fixed. These metalens are therefore not configurable. To build configurable optical elements, fins 355A and 355B are implemented using programmable materials as will be explained next.

Figure 4A:
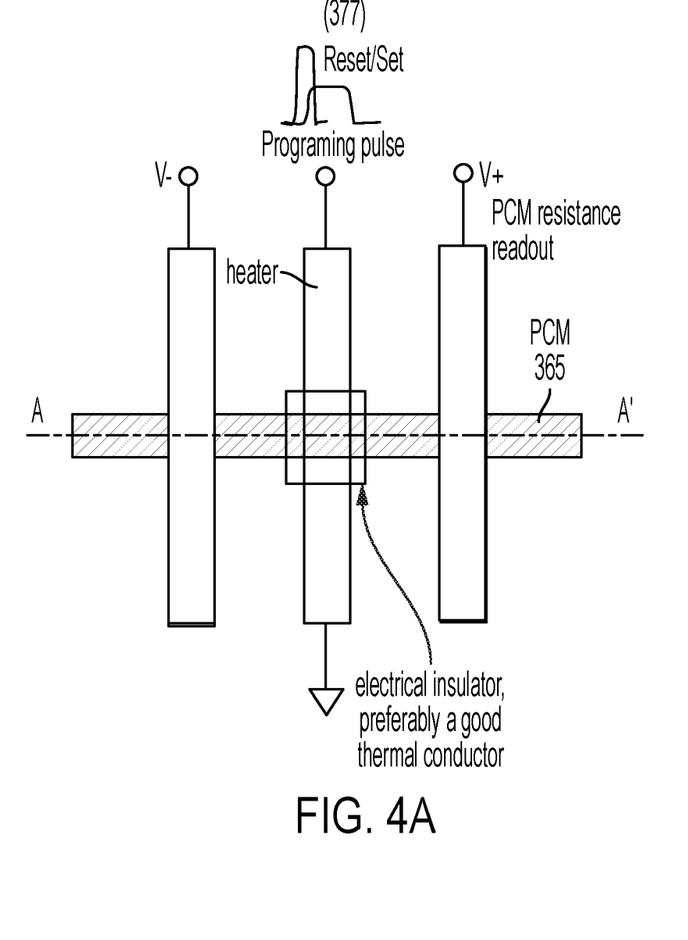
FIG. 4A is a top down view of a phase change material (PCM) control system in accordance with embodiments of the present invention.
Figure 4B:
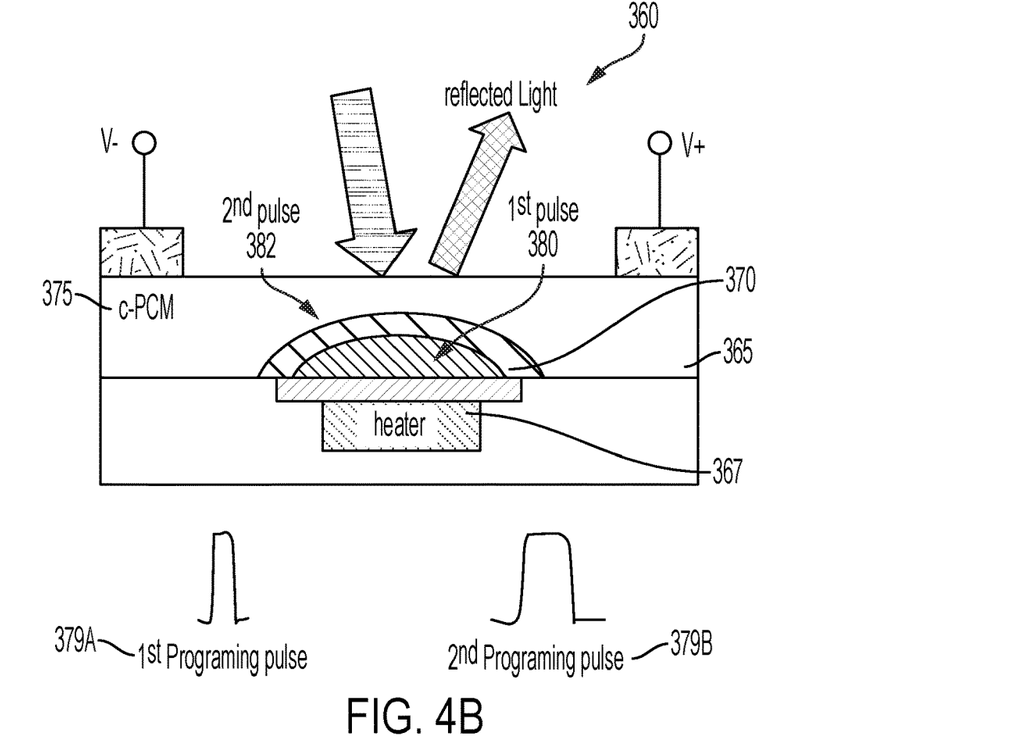
FIG. 4B is a cross-sectional view of the PCM control system of FIG. 4A.

As shown in FIGS. 4A and 4B, a programmable fin 365 is provided. The programmable fin 365 can be formed of material that is made of a group of materials know as phase change materials (PCM). A PCM can be in one of two phases: amorphous phase and crystalline phase. Examples of such materials are: Germanium antimony telluride ($Ge_2Sb_2Te_5$), GeTe, $Sb_2Te_3$, GaSb, SnInSn, GeSbMnSn, AgInSbTe and many others. When the PCM is in the amorphous phase, the material has a low refractive index (for wavelength longer than ~1000 nm), and electrically it exhibits high resistivity. When the PCM is in the crystalline phase, the PCM exhibits high refractive index and low electrical resistance. To set the PCM in the crystalline phase, the PCM is heated to a temperature above its crystallization temperature. The crystallization temperature depends on the PCM composition. For example, the crystallization temperature of $Ge_2Sb_2Te_5$ is about 170° C. For many PCMs, the crystallization temperature is in the range of 100° C. to 300° C. When the PCM is crystallized, it is referred to as to being "set". To obtain PCM in the amorphous phase, the PCM is heated to its melting temperature and then cooled fast so it will not have the opportunity to crystallize. This operation is referred to as melt-quenched, and the material is said to be "reset".

The programmable fin 365 is formed of a PCM. A resistive heater 367 is placed under the fin 365. When a programming current pulse is applied to the heater 367, the resistive heater 367 changes the temperature in the programmable fin 365. When a reset pulse is applied, which typically includes a high current pulse that is abruptly quenched, enough heat is delivered to the programmable fin 365 to cause a melt-quench of the PCM material. For example, when a short reset programming pulse 379A is applied to the resistive heater 367, a first region adjacent to the resistive heater 367 of amorphous material 380 is formed. If a longer reset pulse 379B is applied, a larger region adjacent to the resistive heater 367 of amorphous material 382 is formed. If the reset pulse 379B is further extended in time to deliver more heat to the programmable fin 365 it is possible to fully amorphize the whole height of the programmable fin 365.

To obtain amorphous material, the reset current pulse must drop abruptly so melt-quench of the PCM is achieved. When a set current pulse, which typically includes a moderate current, the heat delivered to the programmable fin 365 will anneal the PCM and cause it to crystallize. As such, reset or set pulses can be used to tune how much of the programmable fin 365 is amorphous and how much is crystalline.

Figure 5:
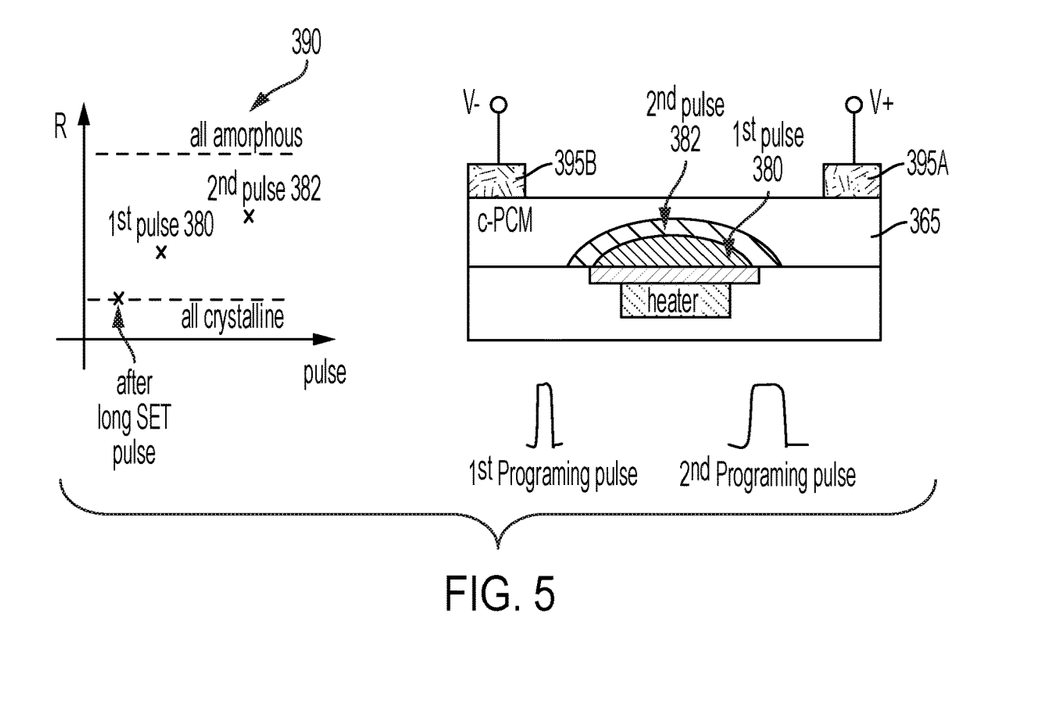
FIG. 5 depicts a control scheme of the PCM control system of FIGS. 4A and 4B in accordance with embodiments of the present invention.

As shown in FIG. 5, which will be used to discuss how the material of the programmable fin 365 can be accurately tuned to the desired amount of amorphous or crystalline material, the programmable fin 365 resistance is measured between contacts 395A and 395B. When the programmable fin 365 is fully crystalline, the measured resistance between contacts 395A and 395B will be the lowest since all of the programmable fin 365 body includes crystalline PCM which is the phase characterized by low resistivity. This is illustrated in graph 390. To achieve an all crystalline programmable fin 365, a long set pulse is applied. When a first short reset pulse 379A is applied, the region 380 adjacent to the resistive heater 367 will turn amorphous. The total resistance between contacts 395A and 395B will increase as illustrated in graph 390. When a longer second reset pulse 379B is applied, a larger portion 382 of the programmable fin 365 is turned amorphous, leading to a larger resistance between contacts 395A and 395B. Finally, a maximum resistance is achieved when the entire height of the programmable fin 365 is amorphized. Since the portion of amorphous material in the programmable fin 365 can be inferred by reading the resistance, programmable fin 365 optical properties can be accurately tuned to a specified value without resorting to optical measurements.

Contacts 395A and 395B can also be formed under the ends of fin 365 to minimize the interference with the light.

The light processing control unit 230 (see FIG. 2) can be implemented to manipulate light by programming each of the elements in the 2D array. The programming speed depends on the PCM used. Typical programming time for materials like GeSbTe is about 100 ns (nano-seconds). This allows to change the focus of a lens at a time scale which cannot be easily obtained with mechanical systems. The 2D array therefore can achieve both optical focusing and beam steering at speeds that allow acquisition of 10 million pixels per seconds.

With continued reference to FIGS. 1A and 1B and FIG. 2 and in accordance with embodiments of the present invention, the optical element 160 can be configured to include a focusing and/or defocusing element that is controllable to position a focal plane of the light beam B relative to a reflective plane 122 of the second body 121.

The optical element 160 can thus be used to confirm the distance between objects using a time flight measurement for the light beam B. When the light beam B is focused on plane 122, the intensity of the reflected signal $S_R$ will be maximized (as compared with a defocused beam). Using a focusing/defocusing sequence to maximize the reflected light intensity leads to an independent estimate of the distance between support structure 110 and plane 122. Returning now to the example of the malicious object, which tricked the LiDAR by adding a delay to the reflected signal, which would in turn lead to the LiDAR incorrectly calculating the malicious object to be at a larger distance, the disclosed LiDAR is simultaneously using an optical focusing/defocusing to estimate the distance. This allows for a corroboration of the distance inferred from the time of flight measurement to that estimated from the focusing/defocusing method.

Furthermore, the velocity of the reflecting object 121 which is estimated based on the Doppler shift in the reflected signal, can be also be independently verified by steering the emitted light beam to a new location where the object is estimated to arrive after a short period of time, $\Delta t$. A stationary malicious object that artificially sent a reflected signal with a wavelength shift (to fool the LiDAR to measure an apparent velocity) is unlikely to be at the estimated new location after a period of $\Delta t$. As such the LiDAR can use beam steering as an independent method to corroborate the velocity of an object.

To overcome the use of an "inviable cloak" by the malicious object, the disclosed LiDAR can use multiple wavelengths. It is possible to design a coating than can reduce the reflection of light, however, and most coatings are only effective in a range of wavelengths, while outside that range light would be reflected. The disclosed LiDAR is using at least two different wavelength as light sources. The use of multiple lights sources makes it harder for the malicious object to be invisible. Furthermore, it requires that the malicious object will have the capability to receive and "reflect" a delayed pulse of light at different wavelengths.

Thus, as shown in FIGS. 1A and 1B, the light L of the light beam B will be reflected off of the reflective plane 122 of the second body 121 and back toward the receiver 150 predominantly when the light beam B is actually focused on the reflective plane 122 of the second body 121. As such, characteristics of the reflective signal $S_R$ will exhibit signatures reflective of the modification, which, in this case, arise from the focusing and/or defocusing by the focusing and/or defocusing element. The processing unit 210 can thus determine whether the reflected signal $S_R$ corresponds to the original signal $S_O$ based results of the comparison between the reflected signal $S_R$ and original signal $S_O$ while recognizing and accounting for the signatures reflective of the modification within the reflected signal $S_R$.

Figure 6:
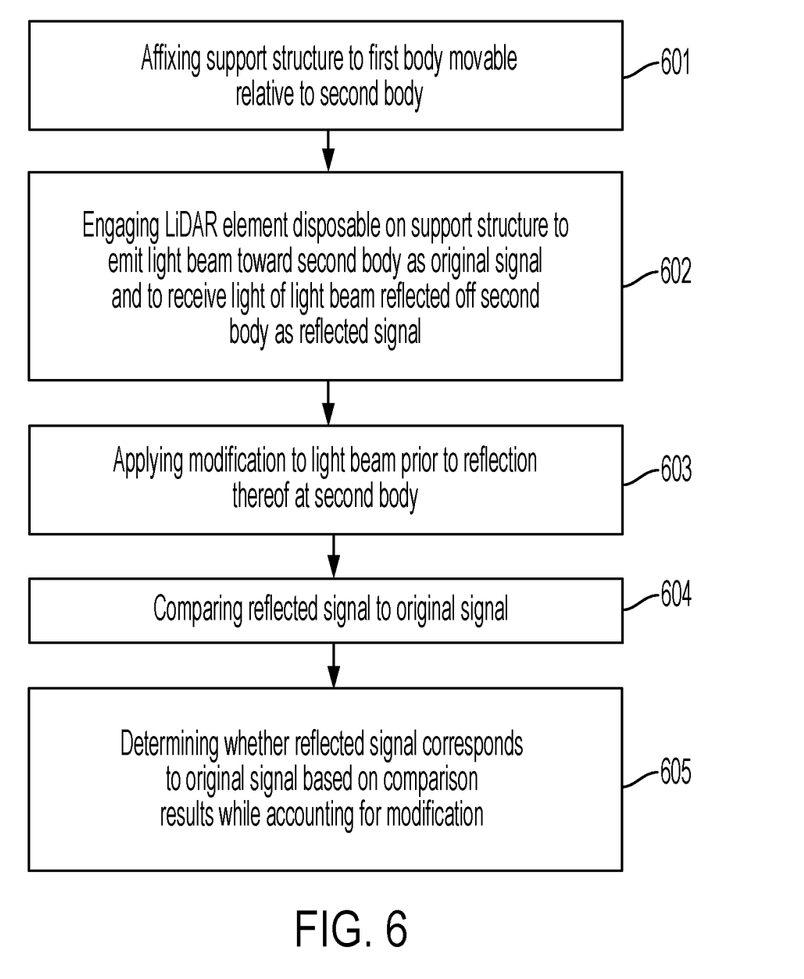
FIG. 6 is a flow diagram illustrating a method of operating the LiDAR system of FIGS. 1A and 1B in accordance with embodiments of the present invention.

With reference to FIG. 6, a method of operating the tamper-proof LiDAR system 101 as described above is provided. As shown in FIG. 6, the method includes affixing a support structure 110 to a first body 120 movable relative to a second body 121 (601) and engaging a LiDAR element 130 disposable on the support structure 110 to emit a light beam B toward the second body 121 as an original signal $S_O$ and to receive light L of the light beam B that is reflected off the second body 121 as a reflected signal $S_R$ (602). The method further include applying a modification to the light beam B prior to reflection thereof at the second body 121 (603), comparing the reflected signal $S_R$ to the original signal $S_O$ (604) and determining whether the reflected signal $S_R$ corresponds to the original signal $S_O$ based on comparison results while accounting for the modification (605).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A light detection and ranging (LiDAR) system, comprising:
    an emitter for emitting a light beam;
    a configurable light processing control unit to affect the light beam and comprising programmable fins and contacts to measure programmable fin resistance;
    a receiver for receiving the light beam; and
    a computer system to control operations of the light processing control unit, to compute a distance to a target using a time of flight of the light beam from the emitter to the target and from the target to the receiver and to simultaneously corroborate the computed distance by controlling the operations of the light processing control unit to focus and defocus the light beam.

2. The LiDAR system according to claim 1, wherein the emitter uses at least two wavelengths.

3. The LiDAR system according to claim 1, wherein the programmable fins are provided as a two-dimensional array of programmable fins.

4. The LiDAR system according to claim 3, wherein the programmable fin resistance is used to infer optical properties of the fin.

5. The LiDAR system according to claim 3, wherein:
    each programmable fin is formed using phase change material (PCM), and
    optical properties of the PCM are tunable.

6. The LiDAR system according to claim 3, wherein the configurable light processing control unit further comprises a heater under each programmable fin to set optical properties thereof.

7. The LiDAR system according to claim 3, wherein the configurable light processing control unit is programed to manipulate the light beam for focusing and defocusing and for light beam steering.

8. A light detection and ranging (LiDAR) system, comprising:
an emitter for emitting a light beam;
a configurable light processing control unit to affect the light beam;
a receiver for receiving the light beam; and
a computer system to control operations of the light processing control unit, to compute a distance to a target using a time of flight of the light beam from the emitter to the target and from the target to the receiver and to simultaneously corroborate the computed distance by controlling the operations of the light processing control unit to focus and defocus the light beam,
wherein a velocity of the target obtained from Doppler shift is corroborated by a steering of the light beam after a time to an anticipated location of the target and a confirmation that the target has moved as predicted to the anticipated location.

9. A computer system for controlling a light detection and ranging (LiDAR) system, the computer system comprising:
a memory; and
a processor coupled to the memory and the LiDAR system and configured to perform a tamper-proofing method comprising:
controlling a LiDAR element of the LiDAR system to emit a light beam toward a second body as an original signal and to receive light of the light beam that is reflected off the second body as a reflected signal, wherein the LiDAR element is configured to be coupled to a first body movable relative to the second body;
controlling an optical element optically disposed between the LiDAR element and the second body to apply a modification to the light beam; and
comparing the reflected signal to the original signal to determine whether the reflected signal corresponds to the original signal based on comparison results while accounting for the modification.

10. The computer system according to claim 9, wherein the LiDAR element comprises:
an emitter to emit the light beam toward the second body as the original signal; and
a receiver to receive the light of the light beam that is reflected off the second body as the reflected signal.

11. The computer system according to claim 9, wherein the optical element comprises a focusing/defocusing element that is controllable to position a focal plane of the light beam relative to the second body.

12. The computer system according to claim 9, wherein the optical element comprises a controllable fast light manipulation element to control a focusing or defocusing of the light beam relative to the second body and/or a steering of the light beam.

13. The computer system according to claim 12, wherein the fast light manipulation element comprises one or more of configurable materials based on phase change material (PCM) preforming a function of a grating.

14. The computer system according to claim 12, wherein the fast light manipulation element comprises one or more of configurable materials based on phase change material (PCM) preforming a function of a lens.

15. A tamper-proof light detection and ranging (LiDAR) system comprising:
a LiDAR element disposable on a support structure configured to be affixed to a first body movable relative to a second body, wherein the LiDAR element is configured to emit a light beam toward the second body as an original signal and to receive light of the light beam that is reflected off the second body as a reflected signal;
an optical element optically interposable between the LiDAR element and the second body; and
a processor coupled to the LiDAR element and the optical element and configured to control the optical element to apply a modification to the light beam, to compare the reflected signal to the original signal and to determine whether the reflected signal corresponds to the original signal based on comparison results while accounting for the modification.

16. The tamper-proof LiDAR system according to claim 15, wherein the LiDAR element comprises:
an emitter disposable on the support structure to emit the light beam toward the second body as the original signal; and
a receiver disposable on the support structure to receive the light of the light beam that is reflected off the second body as the reflected signal.

17. The tamper-proof LiDAR system according to claim 15, wherein the optical element comprises a focusing/defocusing element that is controllable to position a focal plane of the light beam relative to the second body.

18. The tamper-proof LiDAR system according to claim 15, wherein the optical element comprises a controllable fast light manipulation element to control a focusing or defocusing of the light beam relative to the second body, and/or steering of the light.

19. The tamper-proof LiDAR system according to claim 18, wherein the fast light manipulation element comprises one or more of configurable materials based on phase change material (PCM) preforming a function of a grating.

20. The tamper-proof LiDAR system according to claim 18, wherein the fast light manipulation element comprises one or more of configurable materials based on phase change material (PCM) preforming a function of a lens.

* * * * *